United States Patent [19]

Tabor et al.

[11] Patent Number: 5,342,884
[45] Date of Patent: Aug. 30, 1994

[54] COMPOSITIONS PREPARED USING FINELY-DIVIDED ISOCYANATE BASED THERMOSET POLYMERS

[75] Inventors: Ricky L. Tabor; Roy E. Morgan, Jr.; Melissa J. Zawisza, all of Lake Jackson, Tex.

[73] Assignee: The Dow Chemical Company, Midland, Mich.

[21] Appl. No.: 110,027

[22] Filed: Aug. 20, 1993

Related U.S. Application Data

[63] Continuation of Ser. No. 528,012, May 23, 1990, abandoned.

[51] Int. Cl.$^5$ .................. C08L 23/04; C08L 51/06; C08L 75/02; C08L 75/04
[52] U.S. Cl. .......................... 525/64; 525/66; 525/67; 525/74; 525/78; 525/80; 525/125
[58] Field of Search .................. 525/64, 66, 67, 74, 525/78, 80, 125

[56] References Cited

U.S. PATENT DOCUMENTS

| 3,272,890 | 9/1966 | O'Leary | 525/125 |
| 3,935,132 | 1/1976 | Gerkin et al. | |
| 4,525,405 | 6/1985 | McKinney et al. | 428/95 |
| 4,883,837 | 11/1989 | Zabrocki | 525/125 |
| 4,957,968 | 9/1990 | Adur et al. | |

FOREIGN PATENT DOCUMENTS

| 354431 | 2/1990 | European Pat. Off. |
| 123483 | 12/1976 | Fed. Rep. of Germany |

*Primary Examiner*—James J. Seidleck
*Assistant Examiner*—Thomas Hamilton, III

[57] ABSTRACT

Compositions comprising a non-isocyanate based thermoplastic polymer and a finely divided isocyanate based thermoset polymer are disclosed. The compositions can optionally further comprise an adhesive thermoplastic compatibilizing agent. Finely divided scrap isocyanate based thermoset polymer materials can be used in preparing these compositions, thus lowering manufacturing and disposal costs. A method to prepare these compositions is also disclosed.

40 Claims, No Drawings

COMPOSITIONS PREPARED USING FINELY-DIVIDED ISOCYANATE BASED THERMOSET POLYMERS

This is a continuation of application Ser. No. 07/528,012 filed May 23, 1990, now abandoned.

BACKGROUND OF THE INVENTION

The present invention is related to the field of isocyanate based thermoset polymers. More specifically, the present invention is related to compositions prepared using isocyanate based thermoset polymers.

Isocyanate based thermoset polymers are commonly prepared for many purposes. For example, automobile fascia, body panels and structural components are often formed from these materials, frequently by means of reaction injected molding. However, molding of these and similar structures often results in significant amounts of thermoset scrap materials.

These scrap materials arise from certain characteristic aspects of the molding process. For example, overfilling of the mold, to reduce the incidence of voids, is often desirable. However, the excess polymer in this instance forms flash, which heretofore has generally been waste material. Scrap is also produced due to the nature of the reaction injection molding process. Typically, an isocyanate-based liquid stream is impingement mixed with an active hydrogen containing liquid stream. The polymerizing mixture is then guided into a mold via a sprue and gate. The sprue and gate is ultimately cut off prior to use, and again represents waste material.

Other sources of scrap also exist. These include, for example, isocyanate based thermoset materials which show defects in paint finishing or molding and the like. At present, from about 5 to about 15 percent of the automotive reaction injected molded parts are designated as scrap and are commonly landfilled at great expense to the manufacturer.

As in the case of reaction injection molded thermoset polymers, the formation of isocyanate based flexible slabstock polymer foams and the subsequent fabrication of such foams into useful articles also results in scrap and resultant waste. Some researchers estimate that up to 25 percent of flexible slabstock polymer foams end up as cutting scraps. (See, e.g., G. Oertel, ed., *Polyurethane Handbook*, Hanser Publishers (Munich 1985) 176.) Other sources of isocyanate-based thermoset polymer scrap include, for examples overflow from molded foams and cast elastomers; cutting scrap and overflow from rigid foams; fiber production scrap; and flashy sprue and gate scrap from structural reaction injection molding and reinforced reaction injection molding.

In view of the above facts efforts are being made to find ways to recycle these scrap materials. For examples U.S. Pat. Nos. 3,738,946 and 3,708,440 describe the hydrolytic conversion of parts made from thermoset polymers back into polyols and/or polyamines for reuse in rigid foam applications. U.S. Pat. Nos. 4,514,530; 4,552,933; and 4,578,412 disclose the use of solutions of pulverized parts in polyamines for thermoset-type molded parts. U.S. Pat. No. 3,935,132 discloses the use of blends of thermoplastic polyurethanes and pulverized thermoset reaction injection molded (RIM) parts to manufacture extruded or molded parts. U.S. Pat. No. 4,439,546 discloses the use of scrap isocyanate-based thermoset reaction injection molded polymers in blends with recycled polyethylene terephthalate polyols in the preparation of rigid foams. Other researchers have also suggested the incineration of scrap thermoset RIM parts to yield heat energy or electrical energy. These methods of recycling thermoset materials offer opportunities to reduce scrap and therefore the resultant waste and expense, but do not entirely solve the scrap problem.

Thus, it would be desirable, from an economic, environmental and commercial standpoint, to develop additional means by which scrap material, particularly isocyanate based thermoset polymeric material, can be converted into a useful resource. Such means would preferably be able to be employed onsite at manufacturing facilities.

SUMMARY OF THE INVENTION

Accordingly, the present invention provides a composition comprising (a) a non-isocyanate based thermoplastic polymer, and (b) a finely-divided isocyanate based thermoset polymer. Optionally, the composition can also comprise a thermoplastic adhesive compatibilizing agent. In another aspect, the present invention provides a method for preparing these compositions.

The present invention thus provides a means of utilizing scrap thermoset materials as fillers for non-isocyanate based thermoplastic polymers, thereby reducing waste disposal problems previously encountered with these materials and allowing manufacturers to recover value from scrap isocyanate based thermoset polymers.

DESCRIPTION OF THE PREFERRED EMBODIMENTS

In the present invention a non-isocyanate based thermoplastic polymer is used as the "base" or "matrix" material in which the finely-divided isocyanate based thermoset polymer is incorporated. A large number of non-isocyanate based thermoplastic materials can advantageously be used. For example, olefinic type resins including low density polyethylenes, linear low-density polyethylenes; high density polyethylenes; polypropylenes; poly(4-methyl pentene); medium density polyethylenes; propylene/ethylene copolymers; ethylene/vinyl acetate copolymers; ethylene/methyl methacrylate copolymers; ionomers of ethylene/acrylic acid and ethylene/methacrylic acid copolymers; ethylene/carbon monoxide copolymers; blends of olefinic type thermoplastics with rubbers; terpolymers of ethylene, propylene and diene; polybutylenes; polyisobutylenes; atactic polypropylenes; hydrolyzed ethylene/vinyl acetate copolymers; ethylene/butyl acrylate copolymers; interpolymers of ethylene and one or more ethylenically unsaturated carboxylic acid or derivative including, but not limited to, those selected from the group consisting of acrylic acid, methacrylic acid, alkylacrylates, and vinyl acetate; mixtures thereof; and the like, can be effectively used as the base resin. Distinctions between high and low density polyethylenes are more fully described in U.S. Pat. No. No.4,237,009, which is incorporated herein by reference. In practicing the present invention it is also advantageous to blend several selected thermoplastic base resins together in order to yield a final composition showing improved properties.

Non-olefinic type thermoplastic resins can also be used, including, for example, polycarbonates; polyacetals; polyamides; polyvinyl chlorides; polystyrene; poly(acrylonitrile-co-butadiene-co-styrene); poly(ether ether ketones); polysulfones; poly(methyl methacrylate); and poly(butylene terephthalate); poly(ethylene terephthalate); polyester block copolymers; copolymers of styrene and butadiene; styrene block copolymers; styrene block terpolymers; mixtures thereof; and the like. Additionally, mixtures of non-olefinic type thermoplastic resins with olefinic type thermoplastic resins are effective in the present invention.

In the present invention a finely divided isocyanate based thermoset polymer is incorporated into the non-isocyanate based thermoplastic polymer. This isocyanate based thermoset polymer can be selected from a variety of materials. For example, portions of crosslinked elastomeric polyurethane or polyurethane/urea slabstock, molded or rigid foams are suitable. These materials include, for example, a wide variety of materials such as polyureas, polyurethane/isocyanurates, polyurethanes, mixtures thereof and the like. Polymers previously prepared by reaction injection or other types of molding processes prior to comminution are preferred. Scrap polyurethane flexible and rigid foams are also suitable for conversion to a finely-divided form for introduction as a filler into the thermoplastic matrix polymer.

For example, particularly suitable for use as the isocyanate based thermoset polymer are polymers prepared by the reaction of at least one organic, preferably aromatic polyisocyanate and/or modified polyisocyanate mixture and/or prepolymer, with a chain extender and/or water and/or a crosslinking agent. Optionally one or more active hydrogen containing oligomers can also be used. This reaction can be carried out in either the presence or absence of one or more catalysts.

The organic isocyanate containing starting materials preferably are selected from organic polyisocyanates such as aliphatic, cycloaliphatic and preferably multivalent isocyanates such as 1,6-hexamethylenediisocyanate; 1-isocyanato-3,5,5-trimethyl-1-3-isocyanatomethylcyclohexane; 2,4- and 2,6-hexahydrotoluenediisocyanate, as well as the corresponding isomeric mixtures; 4,4'-, 2,2'- and 2,4'-dicyclohexylmethanediisocyanate, as well as the corresponding isomeric mixtures; 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates (crude-MDI); and mixtures of crude-MDI and toluene diisocyanates.

Also advantageously used for the isocyanate based thermoset polymer starting materials are the so-called modified multivalent isocyanates, i.e., products which are obtained through chemical reactions of the above diisocyanates and/or polyisocyanates. Exemplary are polyisocyanates containing the following groups; esters, ureas, biurets, allophanates and preferably carbodiimides, isocyanurate and/or urethane group containing diisocyanates and/or polyisocyanates. Individual examples are aromatic polyisocyanates containing urethane groups, having NCO contents of from 2 to 33.6 weight percent, more preferably of from 21 to 31 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, individual examples are diethylene glycols, dipropylene glycols, polyoxyethylene glycols, polyoxypropylene glycols and polyoxypropylenepolyoxyethylene glycols. Suitable also are prepolymers containing NCO groups, having NCO contents of from 2 to 25 weight percent, more preferably from 14 to 24 weight percent. Liquid polyisocyanates containing carbodiimide groups and/or isocyanurate rings, having NCO contents of from 8 to 33.6 weight percent, more preferably from 21 to 31 weight percent, can also be used. These include, for example, polyisocyanates based on 4,4'- 2,4'- and/or 2,2'-diphenylmethanediisocyanate and the corresponding isomeric mixtures, 2,4- and/or 2,6-toluenediisocyanate and the corresponding isomeric mixtures, 4,4'-, 2,4'- and 2,2'-diphenylmethanediisocyanate and the corresponding isomeric mixtures; mixtures of diphenylmethanediisocyanates and polyphenylpolymethylenepolyisocyanates (crude MDI) and mixtures of toluenediisocyanates and crude MDI and/or diphenyl methane diisocyanates.

Also used are: (i) polyisocyanates containing carbodiimide groups and/or urethane groups, from 4,4'-diphenylmethanediisocyanate or a mixture of 4,4'- and 2,4'-diphenylmethanediisocyanates having an NCO content of from 8 to 33.6 weight percent; (ii) prepolymers containing NCO groups, having an NCO content of from 8 to 25 weight percent, based on the weight of the prepolymer, prepared by the reaction of polyoxyalkylene polyols, having a functionality of from 2 to 4 and a molecular weight of from 600 to 15,000 with 4,4'-diphenylmethanediisocyanate or with a mixture of 4,4'- and 2,4'-diphenylmethanediisocyanates and mixtures of (i) and (ii); and (iii) 2,4- and 2,6-toluenediisocyanate and the corresponding isomeric mixtures.

Polyoxyalkylene polyols are preferred for use as the optional active hydrogen containing oligomer. These polyols preferably have a functionality of from about 2 to about 8 and a molecular weight of from about 600 to about 15,000. Analogous polyoxyalkylene polyols having molecular weights of from about 98 to 15,000 are used for the preparation of polyoxyalkylene polyamines. Such polyoxyalkylene polyols can be prepared by known methods, such as by anionic polymerization using alkali hydroxides, including sodium hydroxide, potassium hydroxide, or alkali alcoholates as catalysts. The alkali alcoholates include, for example, sodium methylate, sodium or potassium ethylate or potassium isopropylate. Alternatively, cationic polymerization using Lewis acids, such as antimony pentachloride, boron trifluoride etherate and the like, or bleaching earth as catalysts can also be carried out to prepare the polyoxyalkylene polyols. In this case one or more alkylene oxides having from 2 to 4 carbon atoms in the alkylene radical and an initiator molecule, which contains from 2 to 8 reactive hydrogen atoms in bonded form, can preferably be used.

The polyoxyalkylene polyamines, having amino groups in bonded form on the aliphatic radical, can be prepared according to conventional processes. For example, the aforesaid polyoxyalkylene polyols can be cyanoalkylated to form the nitrile, which can then be hydrogenated (see U.S. Pat. No. 3,267,050, which is incorporated herein by reference in its entirety). Another means of preparing the polyoxyalkylene polyamines is to aminate the polyoxyalkylene polyols with ammonia in the presence of hydrogen and catalysts (see DE Patent Application No. 12 15 373, incorporated herein by reference in its entirety).

Suitable polyoxyalkylene polyamines having amino groups in bonded form on the aromatic radical can be prepared by, for example, reacting the above mentioned polyoxyalkylene polyols with aromatic polyisocyanates in a ratio of NCO:OH groups of at least about 2. The resulting prepolymers containing aromatic NCO groups can subsequently be hydrolyzed to form polyamines, as is known to those skilled in the art.

The polyoxyalkylene polyamines can be employed as individual compounds or in mixtures from products having differing molecular weights and functionalities. Polyazomethines as described in U.S. Pat. No. 4,789,691, incorporated herein by reference, can also be utilized as the optional active hydrogen containing oligomer.

Primary aromatic di- or polyamines are efficaciously used as the chain extenders for use in the preparation of the isocyanate based thermoset polymers useful in the present invention. Additionally, polyfunctional alcohols having a molecular weight below about 600 are suitable for such use. Blends containing combinations of polyfunctional alcohols, di- or polyfunctional aromatic amines, and water are also suitable.

In forming the isocyanate based thermoset polymers useful in the present invention it is optionally possible to use one or more catalysts for the reaction. If catalysts are to be used, organic metal compounds such as, for example, stannous octoate and tin dilaurate can be used. Other catalysts include strongly basic amines and metal or ammonium hydroxides. Among these are 1,4-diazobicyclo-(2,2,2)-octane; triethylamine; alkali hydroxides; alkali alcoholates; tetramethyl ammonium hydroxide; mixtures thereof; and the like.

Blowing agents which can be used in preparing the isocyanate based thermoset polymers of the present invention are preferably low boiling-point liquids which vaporize under the influence of the exothermic addition polymerization reaction. Liquids which are suitable are inert to the organic polyisocyanate and preferably have boiling points below about 100° C. Examples of these liquids include, in particular, halogenated hydrocarbons such as methylene chloride, trichlorofluoromethane, dichlorodifluoromethane, dichloromonofluoromethane, dichlorotetrafluoroethane and 1,1,1-trichloro-1,2,2-trifluoroethane, and mixtures thereof. Water can also be used as a blowing agent. These blowing agents can alternatively be mixed with other substituted or unsubstituted hydrocarbons.

In preparing the isocyanate based thermoset polymers useful in the present invention the selected blowing agent is acceptably used in an amount determined by the desired density of the target product from which the scrap material will be derived. Commonly amounts of from about 1 to about 15 weight percent, more preferably from about 2 to about 11 weight percent, based on the weight of polyol can be advantageously used.

In preparing the thermoset polymers useful in the present invention it is also possible to employ auxiliaries and/or additives which alter the properties of the reactants or final product. For example, surfactants, foam stabilizers, cell regulators, fillers, reinforcing agents, flame retardants, external and/or internal release agents, colorants, pigments, agents to prevent hydrolysis, fungistats, bacteriostats and the like can be used.

Surfactants which can be used include those compounds which improve the homogenization of the starting components, and which also generally regulate cell structure. Typical examples are emulsifiers, such as the sodium salts of ricinoleic sulfates or fatty acids; salts of fatty acids having amines, e.g., oleic acid diethanolamine, stearic acid diethanolamine, and ricinoleic acid diethanolamine; salts of sulfonic acid, e.g., alkali salts or ammonium salts of dodecylbenzoic acid or dinaphthylmethanedisulfonic acid and ricinoleic acid; foam stabilizers such as siloxaneoxyalkylene mixed polymers and other organo-polysiloxanes, oxyethylated alkylphenols, oxyethylated fatty alcohols, paraffin oils, ricinoleic ester and/or ricinoleic acid;, turkey red oil; peanut oil; and mixtures thereof. Particularly suitable for cell regulation are the paraffins, fatty alcohols, dimethylpolysiloxanes, and mixtures thereof. The surfactants are generally used in amounts of from about 0.01 to about 5 parts by weight, based on weight of polyol.

The fillers which can be used in the isocyanate based thermoset polymers used in the present invention include, for example, conventionally known organic and inorganic fillers, reinforcing agents, weight increasing agents, agents to improve paint wear, coating agents, and the like. Typical inorganic fillers include silicate minerals such as antigorite serpentine, horn blends, amphibole, chrysotile, talcum, mica, metal oxides such as kaolin, aluminum oxide, titanium oxide, and iron oxide; metal salts such as chalk and heavy spar; and inorganic pigments such as cadmium sulfide, zinc sulfide, glass; mixtures thereof; and the like. Preferably used are kaolin (China clay); aluminum silicate; coprecipitates of barium sulfate and aluminum silicate; natural and synthetic fibrous minerals, such as wollastonite; and glass fibers of different lengths which also may be sized. Preformed mats of glass fibers such as those used in structural reaction injection molding processes can also be used. Typical organic fillers include coal, melamine, pine resin, cyclopentadienes and graft polymers based on styrene acrylonitrile, which are prepared by in situ polymerization of acrylonitrile-styrene mixtures in polyether polyols. Fillers based on polyoxyalkylene polyamines, in which the aqueous polymer dispersions are converted into polyoxyalkylene polyamine dispersions, can also be effectively used.

The selected inorganic and organic fillers can be used individually or in mixtures. Preferably used are sized short glass fibers having lengths smaller than about 0.4 mm, more preferably smaller than about 0.2 mm. The inorganic and/or organic fillers and/or reinforcing agents are preferably incorporated into the reaction mixture in amounts of from about 0.5 to about 80 weight percent, more preferably from about 3 to about 35 weight percent, based on the weight of polyol.

Flame retardant or ignition resistant additives and/or reactants can also be used in the thermoset polymers useful in the present invention. In general those known to those skilled in the art and conventionally used in thermoset polymer processing can be selected. For example, halogen-substituted phosphates such as tricresylphosphate, tris-2-chloroethyl phosphate, tris-chloropropyl phosphate, tris-2,3-dibromopropyl phosphate, and mixtures thereof and the like can be employed. Inorganic flame retardancy/ignition resistance agents can also be used, including aluminum trihydrate, antimony trioxide, arsenic oxide, ammonium polyphosphate and calcium sulfate and/or melamine. It is generally preferable to incorporate from about 5 to about 50 parts by weight, more preferably from about 5 to about 25 parts by weight, based on weight of polyol.

Further information concerning the above-described conventional auxiliaries and additives can be found in the technical literature, for example, in the monograph by J. H. Saunders and K. C. Frisch, *High Polymers*, volume XVI, "Polyurethanes", parts 1 and 2, Interscience Publishers, 1962 and/or 1964, or in *Plastics Handbook*, "Polyurethanes", volume VII, Hanser-Verlag, Munich and Vienna, First and Second Editions, 1966 and 1983.

The finely divided isocyanate based thermoset polymer used in the present invention can optionally have included therein paint and/or primer layers. Such layers can occur, for example, in thermoset polymer material selected from automotive parts considered to be scrap due to molding, painting and/or priming defects. Examples of such paints and primers include acrylic basecoats based on urethanes, polyesters, melamine-formaldehyde and the like; lacquers; enamels; acrylic primers; primer surfacers; modified acrylic basecoats and clearcoats; other primers, primer surfacers, basecoats and clearcoats commonly used in the automotive industry in particular; mixtures thereof; and the like.

In the process of the present invention it is optional to further employ a compatibilizing thermoplastic adhesive polymer, in addition to the finely divided isocyanate based thermoset polymer and the non-isocyanate based thermoplastic polymer. The compatibilizing adhesive polymer serves to increase the adhesion between the finely divided material and the thermoplastic matrix resin, thus improving physical properties of the composite material. Suitable compatibilizing adhesive polymers include, for example, adhesive thermoplastic compositions conventionally used as adhesives for polyamide-containing multilayer films or laminates. These include, for example, ethylene/acrylic acid interpolymers and graft copolymers of maleic anhydride with thermoplastic polyolefins, such as high density polyethylene, low density polyethylene and linear low density polyethylene. Also preferred are interpolymers of ethylene/methacrylic acid and ethylene/vinyl acetate interpolymers. Blends of polyolefins grafted with anhydride or diacid functionality with unmodified polyolefins, such as those described in U.S. Pat. Nos. 4,684,576; 4,487,885; and 4,394,485, can also be employed.

The proportions of the components of the present invention are determined according to the amount of thermoset material available as well as the desired physical properties of the final product. In general, it is desirable and preferred that the non-isocyanate based thermoplastic polymer matrix material be used in an amount from about 5 percent to about 99.5 percent by weight. It is more preferred that the thermoplastic resin represent from about 50 percent to about 99 percent by weight of the composition.

The thermoset polymer material used in the present invention is preferably incorporated in an amount of from about 0.5 percent by weight to about 95 percent by weight, based on weight of the total composition. It is more preferred that it be present in an amount of from about 1 percent by weight to about 50 percent by weight, and still more preferred that it be from about 2 to about 20 percent by weight.

The optional adhesive polymer of the present invention is preferably present in a range of from about 0.5 percent by weight to about 95 percent by weight. It is more preferred that the adhesive polymer range be from about 3 percent by weight to about 50 percent by weight, based on weight of the total composition.

Once the materials for the composition have been selected it is necessary to combine them. In order to do this it is necessary that the thermoset material be finely divided in order to aid in processing with the themoplastic matrix. Comminution can be carried out using conventional grinding means and methods, such as grinding, milling, cutting, sawing, crushing, pulverizing, or other size reduction techniques, with or without the use of cooling aids such as cryogenic means, water, air and the like. Combinations of size reduction techniques can also be effectively employed. It is preferable that the thermoset material be finely divided to a maximum particle size ranging from about 0.1 micrometer to about 13,000 micrometers, more preferably from about 0.1 micrometer to about 2,000 micrometers, and most preferably from about 40 micrometers to about 1,000 micrometers. Thus, powders and dusts of thermoset scrap material, such as may be collected around cutting equipment, can be used in the practice of the present invention. Pulverized or powdered molded materials, such as ground defective parts, can also be effectively employed.

To combine the components of the present invention it is desirable to mix them together. The order of mixing can be varied according to the convenience and desire of the practitioner, and methods of mixing commonly used by those skilled in the art, such as extrusion, Banbury mixing, roll milling, or calendering, for example, can be selected.

Time, temperature and pressure can also be varied according to the desire of the practitioner. However, it is preferable that the time be sufficient to ensure a very high degree of mixing and therefore homogeneity of the final part. Those skilled in the art will be familiar with these techniques without further instruction.

Following mixing, the compositions of the present invention, comprising a non-isocyanate based thermoplastic polymer, finely-divided isocyanate based thermoset polymer, and, optionally, an adhesive thermoplastic compatibilizing agent, can be processed by various means to produce a useful final part. Those skilled in the art will be familiar with means and methods for preparing injection molded, blow molded, compression molded, thermoformed, or profile extruded parts, film, sheeting or tubing. These parts can be used in, for example, automotive door panels and liners, sporting equipment, trash receptacles, bumper strips, food service trays, and the like.

The final result is a composition which utilizes finely-divided isocyanate based thermoset material, which in one embodiment can be obtained as scrap material, thus potentially reducing the cost of the final composition and reducing landfill and general disposal problems later on.

The following examples are given to more fully illustrate the present invention. As such, they are not intended to be, nor should they be construed as being, limitative of the scope of the invention. All parts and percentages are by weight unless otherwise indicated.

EXAMPLE 1

Scrap isocyanate based RIM thermoset polymer made from the formulation below is pulverized to about 80 mesh size (U.S.).
Formulation:
 "A" Side:
  Isocyanate A
 "B" Side:
  76 parts of Polyol A
  15.5 parts of diethyl toluene diamine 4 parts of an aminated diol
2 parts of zinc stearate
1 part of Polyol B
0.10 parts of dimethyltin dilaurate
0.05 parts of a silicone-based surfactant The pulverized scrap reaction injection molded thermoset polymer, referred to as "powdered RIM" material in this example, is melt-blended with linear low density polyethylene ("LLDPE"), which is a nominal 0.918 g/cc, 5.5 g/10 min. ethylene/octene copolymer. Compositions containing about 10 percent, 25 percent, and 50 percent by weight of the powdered RIM are prepared, and a linear low density polyethylene composition containing without any powdered RIM is also prepared as Comparative Example A. The melt-blending is done using a 6-inch Farrell two-roll mill, having one roll heated to about 350° F. and the other roll chilled to about 90° F. by means of tap water. Plaques are then prepared by compression molding.

The plaques are tested to determine several physical properties, as shown in Table 1 below.

TABLE 1

| Physical Property | Comparative Example A* (no powdered RIM) | 10 percent powdered RIM | 25 percent powdered RIM | 50 percent powdered RIM |
| --- | --- | --- | --- | --- |
| Specific Gravity | 0.912 | 0.923 | 0.952 | 0.993 |
| Tensile Modulus (psi) | 15,250 | 16,170 | 12,570 | — |
| Tensile Strength (psi) | 1,530 | 1,332 | 1,110 | 607 |
| Elongation (%) | 481 | 452 | 87 | 19 |
| Flexural Modulus (psi) | 38,200 | 45,900 | 48,800 | 39,900 |
| Tear Strength (pli) | 664 | 525 | 352 | 177 |

*Not an example of the present invention.
— No data available.

EXAMPLE 2

A second set of compositions and compression molded plaques are prepared using the methods, materials and proportions described in Example 1, except that the powdered RIM material and linear low density polyethylene ("LLDPE") are compatibilized using a high density polyethylene which has been graft copolymerized with 1.0 percent maleic anhydride ("PE-g"). The compatibilizing component is melt-blended with the other materials in proportions of (a) 9 percent PE-g with 25 percent powdered RIM in LLDPE; and (b) 13 percent PE-g with 25 percent powdered RIM in LLDPE. The values attained by a composition containing 25 percent powdered RIM in LLDPE without compatibilizer, and a composition containing LLDPE only, without either powdered RIM or compatibilizer (Comparative Example A), are reproduced from Table 1 to show the effect of the compatibilizer. Physical properties are then tested and recorded in Table 2.

TABLE 2

| Physical Property | Comparative Example A* (no powdered RIM or PE-g) | 25% powdered RIM in LLDPE (from Example 1) | 25% powdered RIM and 9% PE-g in LLDPE | 25% powdered RIM and 13% PE-g in LLDPE |
| --- | --- | --- | --- | --- |
| Specific Gravity | 0.912 | 0.952 | 0.957 | 0.957 |
| Tensile Modulus (psi) | 15,250 | 12,570 | 19,696 | 19,420 |
| Tensile Strength (psi) | 1,530 | 1,110 | 1,758 | 1,664 |
| Elongation (%) | 481 | 87 | 427 | 331 |
| Flexural Modulus (psi) | 38,200 | 48,800 | 47,900 | 49,000 |
| Tear Strength (pli) | 664 | 352 | 571 | 628 |
| Notched Izod (ft.lb./in.) | no break | 1.48 | no break | — |

*Not an example of the present invention.
— No data available.

EXAMPLE 3

Compositions are prepared as in Example 1, except that various proportions of an ethylene/vinyl acetate ("EVA") copolymer containing 6 percent vinyl acetate and having a 2.5 melt index, are used as the non-isocyanate based thermoplastic polymer. The powdered RIM material is the same as in previous examples except that milled glass was added to some of the thermoset compositions prior to pulverizing, as indicated in Table 3 below. Additionally, some of the RIM parts were painted prior to pulverizing. Mesh sizes for the powdered RIM material are also varied as indicated. The amounts of each component and the physical properties tested are shown in Table 3.

TABLE 3

| % EVA | Amount of Powdered RIM (%) | Mesh Size | % PE-g | Tensile Modulus (psi) | Tensile Strength (psi) | Tangent Flex Modulus (psi) | Notched Izod Impact Strength (ft.lb./in.) | Tensile Impact (ft.lb./in.$^2$) | Vicat (°C.) |
| --- | --- | --- | --- | --- | --- | --- | --- | --- | --- |
| 100* | 0 | — | 0 | 13,100 | 2370 | 23,900 | 7.28 no break | 132.4 | 81.6 |
| 67.7 | 0** | — | 13.3 | 18,200 | 1250 | 44,400 | 9.09 no break | 99.6 | 85.4 |
| 75 | 25(a) | 50 | 0 | 13,600 | 763 | 26,600 | 1.64 | 21.7 | 77.0 |
| 75 | 25(a) | 30 | 0 | 16,600 | 720 | 25,400 | 1.90 | 29.9 | 78.4 |

TABLE 3-continued

| % EVA | Amount of Powdered RIM (%) | Mesh Size | % PE-g | Tensile Modulus (psi) | Tensile Strength (psi) | Tangent Flex Modulus (psi) | Notched Izod Impact Strength (ft.lb./in.) | Tensile Impact (ft.lb./in.$^2$) | Vicat (°C.) |
|---|---|---|---|---|---|---|---|---|---|
| 65 | 25(b) | 50 | 10.0 | 18,400 | 1090 | 33,600 | 3.82 | 44.4 | 83.7 |
| 65 | 25(c) | 30 | 10.0 | 19,300 | 1180 | 37,900 | 4.41 | 26.2 | 86.3 |
| 80 | 10(a) | 50 | 10.0 | 19,000 | 1260 | 40,400 | 7.59 | 47.3 | 85.4 |
| 80 | 10(d) | 30 | 10.0 | 17,900 | 1210 | 36,000 | 7.13 | 48.1 | 84.5 |

*Comparative Example B. Not an example of the present invention.
**Comparative Example C. Not an example of the present invention.
— Not applicable.
(a) Original isocyanate based thermoset RIM part contained 15% milled glass filler; not painted prior to pulverizing.
(b) Original isocyanate based theremoset RIM part contained 0% milled glass filler; not painted prior to pulverizing.
(c) Original isocyanate based thermoset RIM part contained 0% milled glass; painted prior to pulverizing.

EXAMPLE 4

Injection molded plaques containing an acrylonitrile-co-butadiene-co-styrene block terpolymer thermoplastic are prepared incorporating the powdered RIM used in Example 1. The compositions are made by mixing the polymer and the powdered RIM material in a 40 mm twin screw extruder with a screw length/diameter ratio of 7.62. The powdered RIM thermoset polymer is dried in a dehumidifying oven at 80° C. for about 16 hours prior to compounding. About 0.1 percent by weight of FLEXOL EPO* plasticizer (an epoxidized soybean oil-*FLEXOL EPO is a trademark of Union Carbide Corporation) is added to aid processing. The extruder has three zones with an average temperature profile of 210° C., and is operated at 28 rpm. Injection molding of the parts from which test specimens are derived is done on a laboratory scale injection molder at a barrel average temperature profile of 210° C. and a mold temperature of 55° C. Physical properties are recorded in Table 4.

TABLE 4

| | Flexural Modulus (psi) | Tensile Modulus (psi) | Ultimate Tensile Strength (psi) | Percent Elongation | Notched Izod Impact Strength (ft.lb./in.) |
|---|---|---|---|---|---|
| Comparative Example D* (100% ABS$^a$) | 311,100 | 384,400 | 5506 | 13.8 | 9.2 |
| 90% ABS$^a$ 10% Powdered RIM | 282,700 | 310,000 | 4400 | 6.1 | 3.6 |
| 75% ABS$^a$ 25% Powdered RIM | 220,600 | 378,400 | 3500 | 2.8 | 1.7 |

*Not an example of the present invention.
$^a$The ABS has a nominal melt flow rate (ASTM D1238 230/3.8) of 2.2 g/10 min., an acrylonitrile termonomer content of 23 percent, and a butadiene termonomer content of 20 percent.

EXAMPLE 5

Table 5 summarizes the physical properties of injection molded plaques prepared containing XENOY* 1102 (*XENOY is a trademark of General Electric Corporation) thermoplastic and the powdered RIM used in Example 1. The powdered RIM is dried in a dehumidifying oven at 80° C. for about 16 hours prior to compounding. About 0.1 percent by weight of FLEXOL* EPO plasticizer (epoxidized soybean oil; *FLEXOL is a trademark of Union Carbide Corporation) is added to aid processing. The compositions are made by mixing the two components in the twin screw extruder as described in Example 4 using an average temperature profile of 240° C. and 35 rpm screw speed. Injection molding is done in the same manner as in Example 4, using an average temperature profile of 240° C. and a mold temperature of 65° C.

TABLE 5

| | Flexural Modulus (psi) | Tensile Modulus (psi) | Ultimate Tensile Strength (psi) | Percent Elongation | Notched Izod Impact Strength (ft.lb./in.) |
|---|---|---|---|---|---|
| Comparative Example E* (100% XENOY 1102$^a$, no powdered RIM) | 265,300 | 473,900 | 6500 | 8.7 | 5.6 |
| XENOY* 1102 10% Powdered RIM | 236,300 | 337,700 | 5300 | 6.4 | 2.0 |
| XENOY* 1102 25% Powdered RIM | 188,500 | 250,900 | 3900 | 3.6 | 1.6 |

*Not an example of the present invention.
$^{ab}$XENOY* 1102 is believed to consist of 43 percent polycarbonate, 48 percent poly(butylene terephthalate) and 9 percent methyl methacrylate-butadiene-styrene terpolymer.
*XENOY is a trademark of General Electric Corporation. This material is obtained by granulating a scrap automotive bumper which had been injection molded from virgin XENOY* 1102.

EXAMPLE 6

Polyurethane rigid foam dust, obtained from a band saw used to cut rigid foam samples, is collected and used to prepare compositions with linear low density polyethylene (LLDPE) and a high density polyethylene/maleic anhydride graft copolymer ("PE-g"). Processing is as described in Example 1, and proportions are as shown in Table 6. A control, Comparative Example F, is also prepared without any dust.

Since the band saw is used to cut a variety of rigid foam formulation compositions, the exact constituency of the foam dust is not known. However, a typical bunstock rigid foam formulation would be:

"A" Side:
 134 parts of Isocyanate B
 1 part of polysiloxane surfactant

"B" Side:
 31 parts of Polyol C
 3 parts of ethylene oxide
 0.7 part of a polysiloxane surfactant
 3.6 parts of a trimerization catalyst
 1.2 part of diethylene glycol
 0.08 part of dimethyl cyclohexylamine
 26.6 parts of a chlorofluorocarbon blowing agent Formulating and foam preparation would be done as is conventionally practiced in the art.

Properties of the plaques are measured and reported in Table 6.

TABLE 6

| Property | Comparative Example F* (100% LLDPE, no dust) | LLDPE and 10% Dust | LLDPE, 5% PE-g, and 10% Dust |
|---|---|---|---|
| Tensile Modulus (psi) | 20,400 | 34,700 | 40,400 |
| Ultimate Tensile Strength (psi) | 3,500 | 1,250 | 1,810 |
| Elongation (%) | 890 | 71 | 137 |
| Flexural Modulus (psi) | 58,400 | 74,100 | 78,300 |
| Notched Izod (ft.-lbs./in.) | No break | 2.8 (Partial breaks) | 7.48 (50–60% breaks) |

*Not an example of the present invention.

What is claimed is:

1. A composition comprising (a) a non-isocyanate based thermoplastic polymer; (b) as a filler, a finely divided isocyanate based thermoset polymer; and (c) a compatibilizing adhesive polymer.

2. The composition of claim 1 wherein the non-isocyanate based thermoplastic polymer is selected from the group consisting of poly(4-methyl pentene); medium density polyethylenes; low density polyethylene; high density polyethylene; linear low density polyethylene; propylene/ethylene copolymers; ethylene/vinyl acetate copolymers; ethylene/methyl methacrylate copolymers; ionomers of ethylene/acrylic acid or ethylene/methacrylic acid copolymers; ethylene/carbon monoxide copolymers; blends of olefinic thermoplastics with rubbers; terpolymers of ethylene, propylene and diene monomer; polybutylenes; polyisobutylenes; atactic polypropylenes; hydrolyzed ethylene/vinyl acetate copolymers; ethylene/butyl acrylate copolymers; copolymers of styrene and butadiene; styrene block copolymers; polyester elastomers; interpolymers of ethylene and an ethylenically unsaturated carboxylic acid or derivative thereof; polycarbonates; polyacetals; polyamides; polyvinyl chlorides; polystyrene; poly(acrylonitrile-co-butadiene-co-styrene); poly(ether ether ketones); polysulfones, poly(methyl methacrylate); poly(butylene terephthalate); poly(ethylene terephthalate); or a mixture thereof.

3. The composition of claim 2 wherein the non-isocyanate based thermoplastic polymer is medium density polyethylene; low density polyethylene; high density polyethylene, ethylene/vinyl acetate copolymer; linear low density polyethylene; polystyrene; polycarbonate; polyamide; poly(acrylonitrile-co-butadiene-co-styrene); poly(ethylene terephthalate); poly(butylene terephthalate); or a mixture thereof.

4. The composition of claim 1 wherein the finely divided isocyanate based thermoset polymer is polyurea; polyurethane; polyurethane/isocyanurate; polyurethane/urea/isocyanurate; or a mixture thereof.

5. The composition of claim 4 wherein the finely divided isocyanate based thermoset polymer is polyurethane, polyurethane/urea; polyurea; or a mixture thereof.

6. The composition of claim 1 wherein the thermoplastic polymer is present in an amount of from about 5 to about 99.5 percent by weight of the composition.

7. The composition of claim 6 wherein the thermoplastic polymer is present in an amount of from about 50 to about 99 percent by weight of the composition.

8. The composition of claim 1 wherein the finely divided isocyanate based thermoset polymer is present in an amount of from about 0.5 percent to about 95 percent by weight of the composition.

9. The composition of claim 8 wherein the finely divided isocyanate based thermoset polymer is present in an amount of from about 1 percent to about 50 percent by weight of the composition.

10. The composition of claim 1 wherein the compatibilizing adhesive polymer is selected from graft copolymers of maleic anhydride, and at least one thermoplastic olefin.

11. The composition of claim 1 wherein the compatibilizing adhesive polymer is selected from graft copolymers of polyethylene and a monomer selected from maleic anhydride, methyl nadic anhydride, or a mixture thereof; and mixtures thereof.

12. The compositions of claim 1 wherein the compatibilizing adhesive polymer is present in an amount of from about 0.5 to about 95 percent by weight of the composition.

13. The composition of claim 12 wherein the compatibilizing adhesive polymer is present in an amount of from about 3 to about 50 percent by weight of the composition.

14. The composition of claim 1 wherein the compatibilizing adhesive polymer is selected from interpolymers of ethylene and acrylic acid or methacrylic acid, and mixtures thereof.

15. The composition of claim 1 wherein the compatibilizing adhesive polymer is selected from graft copolymers of polyethylene and a monomer selected from maleic acid, nadic acid, fumaric acid, methyl nadic acid, nadic anhydride and mixtures thereof.

16. The composition of claim 1 wherein the compatibilizing adhesive polymer is selected from interpolymers of ethylene and vinyl acetate.

17. The composition of claim 1 wherein the compatibilizing adhesive polymer is selected from blends of polyolefins grafted with an unsaturated anhydride or unsaturated diacid functionality with unmodified polyolefins, and mixtures thereof.

18. A method for preparing a composition comprising blending, as a filler, a finely divided isocyanate based thermoset polymer, a non-isocyanate based thermoplastic polymer, and a compatibilizing adhesive polymer and forming an article therefrom by means of injection molding, blow molding, compression molding, thermoforming, or extrusion.

19. The method of claim 18 wherein blending is done by Banbury mixing or roll milling.

20. The method of claim 18 wherein the non-isocyanate based thermoplastic polymer is selected from the group consisting of poly(4-methyl pentene); medium density polyethylenes; propylene/ethylene copolymers; ethylene/vinyl acetate copolymers; ethylene/methyl methacrylate copolymers; ionomers of ethylene/acrylic acid or ethylene/methacrylic acid copolymers; ethylene/carbon monoxide copolymers; blends of olefinic thermoplastics with rubbers; terpolymers of ethylene, propylene and diene monomer; polybutylenes; polyisobutylenes, atactic polypropylenes; hydrolyzed ethylene/vinyl acetate copolymers; ethylene/butyl acrylate copolymers; copolymers of styrene and butadiene; styrene block copolymers; polyester elastomers; interpolymers of ethylene and an ethylenically unsaturated carboxylic acid or derivative thereof; polycarbonates; polyacetals; polyamides; polyvinyl chlorides; polystyrene; poly(acrylonitrile-co-butadiene-co-styrene); poly(ether ether ketones); polysulfones, poly(methyl methacrylate); poly(butylene terephthalate); poly(ethylene terephthalate); or a mixture thereof.

21. The method of claim 18 wherein the finely divided isocyanate based thermoset polymer is selected from the group consisting of polyurea; polyurethane, polyurethane/isocyanurate, polyurethane/urea/isocyanurate; or a mixture thereof.

22. The method of claim 18 wherein the non-urethane based thermoplastic polymer is present in an amount of from about 5 to about 99.5 percent by weight of the composition.

23. The method of claim 18 wherein the finely divided isocyanate based thermoset polymer is present in an amount of from about 95 percent to about 0.5 percent by weight of the composition.

24. The method of claim 18 wherein the compatibilizing adhesive polymer is selected from the group consisting of ethylene/acrylic acid interpolymers; graft copolymers of high density polyethylene and maleic anhydride; graft copolymers of linear low density polyethylene and maleic anhydride, graft copolymers of low density polyethylene and maleic anhydride; graft copolymers of polyethylene and methyl nadic anhydride, maleic acid, nadic acid, fumaric acid, methyl nadic acid and nadic anhydride; interpolymers of ethylene/methacrylic acid; interpolymers of ethylene/vinyl acetate; blends of polyolefins grafted with anhydride or diacid functionality with unmodified polyolefins; and mixtures thereof.

25. The method of claim 24 wherein the compatibilizing adhesive polymer is a graft copolymer of high density polyethylene and maleic anhydride, a graft copolymer of linear low density polyethylene and maleic anhydride; a graft copolymer of low density polyethylene and maleic anhydride, or a mixture thereof.

26. The method of claim 18 wherein the compatibilizing adhesive polymer is present in an amount of from about 0.5 to about 95 percent by weight of the composition.

27. The method of claim 18 wherein the non-isocyanate based thermoplastic polymer is an olefinic polymer or a mixture thereof.

28. The method of claim 18 wherein the non-isocyanate based thermoplastic polymer is selected from (1) high, medium, low and linear low density polyethylenes; (2) blends of at least one of said polyethylenes with propylene/ethylene copolymers, ethylene/vinyl acetate copolymers, ethylene/methyl methacrylate copolymers, ionomers of ethylene/acrylic acid or ethylene/methacrylic acid copolymers, ethylene/carbon monoxide copolymers, blends of olefinic thermoplastics with rubbers, terpolymers of (a) ethylene, (b) propylene, and (c) diene monomers, polybutylenes, polyisobutylenes, atactic polypropylenes, hydrolyzed ethylene/vinyl acetate copolymers, ethylene/butyl acrylate copolymers, copolymers of styrene and butadiene, styrene block copolymers, polyester block copolymers, polyester elastomers, polyamides, polyvinyl chlorides, polystyrene, poly(acrylonitrile-co-butadiene-co-styrene), poly(butylene terephthalate), poly(ethylene terephthalate), or a mixture thereof; (3) hydrolyzed ethylene/vinyl acetate copolymers; ethylene/butyl acrylate copolymers; (4) interpolymers of ethylene and an ethylenically unsaturated carboxylic acid or derivative thereof; and (5) mixtures thereof.

29. The method of claim 27 wherein the non-isocyanate based thermoplastic polymer is selected from poly(4-methyl pentene); polybutylenes; polyisobutylenes; atactic polypropylenes; and mixtures thereof.

30. The method of claim 18 wherein the non-isocyanate based thermoplastic polymer is selected from copolymers of styrene and butadiene; styrene block copolymers; polystyrene; poly(acrylonitrile-co-butadiene-co-styrene); and mixtures thereof.

31. The method of claim 18 wherein the non-isocyanate based thermoplastic polymer is selected from polyester block copolymers; polyester elastomers; poly(butylene terephthalate); poly(ethylene terephthalate); and mixtures thereof.

32. The method of claim 18 wherein the non-isocyanate based thermoplastic polymer is selected from polycarbonates and mixtures thereof.

33. The method of claim 18 wherein the non-isocyanate based thermoplastic polymer is selected from polyamides and mixtures thereof.

34. The method of claim 18 wherein the non-isocyanate based thermoplastic polymer is selected from polyvinyl chlorides and mixtures thereof.

35. The method of claim 18 wherein the non-isocyanate based thermoplastic polymer is selected from polyacetals and mixtures thereof.

36. The method of claim 18 wherein the non-isocyanate based thermoplastic polymer is selected from poly(ether ketones) and mixtures thereof.

37. The method of claim 18 wherein the non-isocyanate based thermoplastic polymer is selected from polysulfones and mixtures thereof.

38. The method of claim 18 wherein the non-isocyanate based thermoplastic polymer is selected from poly(methyl methacrylate) and mixtures thereof.

39. The method of claim 18 wherein the non-isocyanate based thermoplastic polymer is selected from copolymers of ethylene and vinyl acetate and mixtures thereof.

40. The method of claim 18 wherein the non-isocyanate based thermoplastic polymer is selected from blends of a polycarbonate, a polyester, and a terpolymer of methyl methacrylate, butadiene and styrene.

* * * * *

UNITED STATES PATENT AND TRADEMARK OFFICE
CERTIFICATE OF CORRECTION

PATENT NO. : 5,342,884

DATED : August 30, 1994

INVENTOR(S) : Ricky L. Tabor et al.

It is certified that error appears in the above-identified patent and that said Letters Patent is hereby corrected as shown below:

In claim 2, column 13, line 60, "polysulfones," should read --polysulfones;--.

In claim 2, column 13, line 62, "thereof," should read --thereof.--.

In claim 3, column 13, line 66, "polyethylene," should read --polyethylene;--.

In claim 5, column 14, line 9, "thane," should read --thane;--.

In claim 20, column 15, line 11, "polyisobutylenes," should read --polyisobutylenes;--.

In claim 20, column 15, line 19, "polysulfones," should read --polysulfones;--.

In claim 21, column 15, line 25, "isocyanurate," should read --isocyanurate;--.

In claim 24, column 15, line 40, "anhydride," should read --anhydride;--.

In claim 25, column 15, lines 51 and 54 "anhydride," should read --anhydride;--.

UNITED STATES PATENT AND TRADEMARK OFFICE
CERTIFICATE OF CORRECTION

PATENT NO. : 5,342,884
DATED : August 30, 1994
INVENTOR(S) : Ricky L. Tabor et al.

It is certified that error appears in the above-indentified patent and that said Letters Patent is hereby corrected as shown below:

In claim 36, column 16, line 49, "poly(ether ketones)" should read -- poly(ether ether ketones)--.

Signed and Sealed this

Second Day of January, 1996

Attest:

BRUCE LEHMAN

Attesting Officer

Commissioner of Patents and Trademarks